(12) United States Patent
Glavinic et al.

(10) Patent No.: US 11,427,202 B2
(45) Date of Patent: Aug. 30, 2022

(54) TRAILER BRAKE CONTROL DEVICE, METHOD AND SOFTWARE FOR SAME, AND TRAILER VEHICLE COMPRISING SAME

(71) Applicant: ZF CV Systems Hannover GmbH, Hannover (DE)

(72) Inventors: Andelko Glavinic, Sarstedt (DE); Johannes Heseding, Hannover (DE); Gerd Schuenemann, Laatzen (DE); Sven Gorczyca, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 0 days.

(21) Appl. No.: 17/190,428

(22) Filed: Mar. 3, 2021

(65) Prior Publication Data

US 2021/0188279 A1     Jun. 24, 2021

Related U.S. Application Data

(63) Continuation of application No. PCT/EP2019/071389, filed on Aug. 9, 2019.

(30) Foreign Application Priority Data

Sep. 3, 2018   (DE) ..................... 10 2018 121 439.1

(51) Int. Cl.
*B60T 7/20*     (2006.01)
*B60W 30/18*    (2012.01)
(Continued)

(52) U.S. Cl.
CPC ......... *B60W 30/18181* (2013.01); *B60L 7/26* (2013.01); *B60L 15/2009* (2013.01);
(Continued)

(58) Field of Classification Search
CPC ........ B60T 7/20; B60W 30/18181; B60L 7/26
See application file for complete search history.

(56) References Cited

U.S. PATENT DOCUMENTS

| | | | | |
|---|---|---|---|---|
| 4,771,838 A | * | 9/1988 | Ketcham ................ | B62D 13/00 180/6.62 |
| 5,330,020 A | * | 7/1994 | Ketcham .................. | B60T 7/20 180/14.2 |

(Continued)

FOREIGN PATENT DOCUMENTS

| | | |
|---|---|---|
| DE | 102016003356 A1 | 9/2017 |
| DE | 102016204090 A1 | 9/2017 |

(Continued)

OTHER PUBLICATIONS

ISO "Road vehicles—Connectors for the electrical connection of towing and towed vehicles—Part 1: Connectors for braking systems and running gear of vehicles with 24 V nominal supply voltage", ISO 7638-1:2018(E),May 2018, pp. 1-16,Third Edition, ISO 2018, Geneva, Switzerland.

(Continued)

*Primary Examiner* — Derek D Knight
(74) *Attorney, Agent, or Firm* — Leydig, Voit & Mayer, Ltd.

(57) ABSTRACT

A method, for a trailer brake control device of a vehicle trailer with an electric drive, includes receiving at least one acceleration request signal with a requested positive acceleration or a requested negative acceleration and further receiving a status signal with at least one status variable of the electric drive of the vehicle trailer. The method also includes generating, with a controller of the trailer brake control device, at least one brake actuation signal for at least one friction brake of the vehicle trailer and a torque request signal for the electric drive, each based on the at least one acceleration request signal and the status signal. Further- (Continued)

more, the method includes outputting the brake actuation signal and the torque request signal via at least one output and/or at least one interface of the trailer brake control device.

15 Claims, 4 Drawing Sheets (51) Int. Cl.
| | |
|---|---|
| *B60L 7/26* | (2006.01) |
| *B60L 15/20* | (2006.01) |
| *B60L 15/42* | (2006.01) |
| *B60T 8/1761* | (2006.01) |
| *B60T 8/32* | (2006.01) |
| *B60T 13/66* | (2006.01) |
| *B60W 10/08* | (2006.01) |
| *B60W 10/184* | (2012.01) |
| B62D 59/04 | (2006.01) |

(52) U.S. Cl.
CPC ............... *B60L 15/42* (2013.01); *B60T 7/20* (2013.01); *B60T 8/17616* (2013.01); *B60T 8/321* (2013.01); *B60T 13/662* (2013.01); *B60W 10/08* (2013.01); *B60W 10/184* (2013.01); *B60L 2200/28* (2013.01); *B60L 2240/12* (2013.01); *B60L 2240/16* (2013.01); *B60L 2240/36* (2013.01); *B60L 2240/547* (2013.01); *B60L 2250/26* (2013.01); *B60T 2220/04* (2013.01); *B60T 2240/00* (2013.01); *B60T 2260/09* (2013.01); *B60T 2270/10* (2013.01); *B60T 2270/604* (2013.01); *B60W 2510/081* (2013.01); *B60W 2510/083* (2013.01); *B60W 2510/087* (2013.01); *B60W 2510/244* (2013.01); *B60W 2520/26* (2013.01); *B60W 2540/10* (2013.01); *B60W 2710/083* (2013.01); *B60W 2710/085* (2013.01); *B60W 2710/18* (2013.01); *B62D 59/04* (2013.01)

(56) References Cited

U.S. PATENT DOCUMENTS

| | | | |
|---|---|---|---|
| 8,820,443 B2* | 9/2014 | Ferri | B60D 1/665 |
| | | | 180/14.2 |
| 9,566,854 B2 | 2/2017 | Kerschl et al. | |
| 9,694,712 B2 | 7/2017 | Healy | |
| 9,845,124 B1* | 12/2017 | Ingram | B60T 13/586 |
| 2008/0169144 A1 | 7/2008 | DeGrave | |
| 2008/0174174 A1 | 7/2008 | Burns et al. | |

FOREIGN PATENT DOCUMENTS

| | | |
|---|---|---|
| EP | 2842814 A1 | 3/2015 |
| EP | 3031657 A1 | 6/2016 |
| EP | 2394890 B1 | 5/2018 |

OTHER PUBLICATIONS

ISO "Road vehicles—Interchange of digital information on electrical connections between towing and towed vehicles—Part 1: Physical layer and data-link layer" ISO 11992-1:2003(E), Apr. 2003, pp. 1-28,Second Edition, ISO 2003, Geneva, Switzerland.

* cited by examiner

TRAILER BRAKE CONTROL DEVICE, METHOD AND SOFTWARE FOR SAME, AND TRAILER VEHICLE COMPRISING SAME

CROSS-REFERENCE TO PRIOR APPLICATIONS

This application is a continuation of International Patent Application No. PCT/EP2019/071389, filed on Aug. 9, 2019, which claims priority to German Patent Application No. DE 10 2018 121 439, filed on Sep. 3, 2018. The entire disclosure of both applications is incorporated by reference herein.

FIELD

The present disclosure relates to actuation of electric drives in trailer vehicles. A trailer vehicle is towed by a towing vehicle, which is a commercial vehicle, for example. Such trailer vehicles towed by commercial vehicles—also referred to simply as trailers in the following—are, in particular, semitrailers and drawbar trailers.

BACKGROUND

Commercial vehicles are known, which comprise, in addition to an internal combustion engine as the primary drive source, at least one electric drive for support. The electric drives are utilized in the commercial vehicles, for example, in order to be able to operate the internal combustion engine in an energy-efficient rotational speed range or to provide an additional boost, for example, when the vehicle starts moving or when driving uphill. In addition, kinetic and potential energy of the vehicle can be recuperated with electric drives and stored as electrical energy in at least one energy store.

It is also known that trailers for commercial vehicles can also be equipped with an electric drive, in order to provide, via the trailer, an additional drive force for the commercial vehicle, for example, when driving uphill. In EP 2 842 814 B1, a control unit of the towing vehicle/commercial vehicle is connected to a further control unit in the trailer, and so these communicate. The further control unit then controls an electric drive.

For energy recovery, it is desirable to utilize the at least one electric drive in the trailer for supporting a requested negative acceleration, namely for deceleration. As a result, friction brakes of the trailer vehicle can be conserved. The electric drive by a motor operated as a generator during braking can be utilized for converting kinetic or potential energy of the trailer into electrical energy and, as a result, charging batteries for the electric drive. This energy can be reused later for a positive acceleration, namely for driving the trailer vehicle.

For this purpose, it is known, for example, to provide sensors in the trailer for determining the trailer acceleration and the inclination angle, in order to control the electric drive on the basis of the sensor values. U.S. Pat. No. 9,694,712 B2 describes an example of a trailer vehicle comprising an additional sensor system for controlling an electric drive. In addition, EP 2 394 890 B1 discloses a control of the electric drive of the trailer vehicle by measuring the coupling force between the towing vehicle and the trailer vehicle. An additional sensor system and processing are also necessary for this measurement.

The described control of the electric drive of the vehicle trailer is highly complex, however, since additional sensors and control units must be installed. In addition, this approach is not ideally integrated into the motion sequences of the trailer, and so, on the one hand, a non-optimal energy recovery takes place during deceleration and potential interferences of safety and stability systems can occur due to independent detections of the driving condition of the towing vehicle, on the one hand, and of the trailer by the sensor system of the electric drive, on the other hand.

SUMMARY

In an embodiment, the present invention provides a method for a trailer brake control device of a vehicle trailer with an electric drive. The method includes receiving, from a towing vehicle via at least one input and/or at least one interface of the trailer brake control device, at least one acceleration request signal with a requested positive acceleration or a requested negative acceleration. The method further includes receiving, from the electric drive of the vehicle trailer via the at least one input and/or the at least one interface of the trailer brake control device, a status signal with at least one status variable of the electric drive of the vehicle trailer. The method also includes generating, with a controller of the trailer brake control device, at least one brake actuation signal for at least one friction brake of the vehicle trailer and a torque request signal for the electric drive, each based on the at least one acceleration request signal and the status signal. Furthermore, the method includes outputting the brake actuation signal and the torque request signal via at least one output and/or at least one interface of the trailer brake control device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present disclosure provides for improving the integration of an electric drive into a vehicle trailer, and so an electric drive having a high efficiency is integratable into any possible driving situation and simultaneously supports safety and stability systems of the vehicle in an interference-free manner.

For this purpose, the present disclosure provides a method for a trailer brake control device for a vehicle trailer comprising at least one electric drive. The method, which is described in the following, is therefore implementable by a trailer brake control device, which is an integral part of a vehicle trailer, which is also referred to in the following simply as a trailer. A trailer brake control device designates, here, an electrical controller or an electrical control unit (ECU) of an electrical braking system for a vehicle trailer (TEBS). The electrical braking system for a vehicle trailer includes, in addition to the electrical control unit, for example, at least one brake modulator and further components, which are necessary for carrying out a requested negative acceleration, namely a braking request. In addition, the method relates to vehicle trailers, which comprise an electric drive for driving the vehicle trailer. The vehicle trailer is preferably a vehicle trailer of a commercial vehicle, such as a truck, and is therefore connectable via a drawbar or fifth-wheel coupling to a vehicle, which can then also be referred to as a towing vehicle.

According to the method, at least one acceleration request signal is received from a towing vehicle with at least one input and/or one interface of the trailer brake control device. The acceleration request signal preferably corresponds to a pneumatic brake control pressure (yellow coupling head), a brake control pressure electrically transmitted via the interface designed as an ISO 11992 interface, and/or an electrical continuous braking request via the same ISO 11992 interface. In addition, the acceleration request signal can also correspond to a drive request signal, which is received via the same ISO 11992 interface. The acceleration request signal therefore includes a requested positive or negative acceleration.

In addition, a status signal is received from the electric drive of the vehicle trailer, with the input or one further input and/or the interface or one further interface of the trailer brake control device, for taking at least one status variable of the electric drive into account. By taking this information into account, at least one brake actuation signal for at least one friction brake of the vehicle trailer and one torque request signal for the at least one electric drive are generated with the controller of the trailer brake control device. The brake actuation signal and the torque request signal are each generated on the basis of the previously received acceleration request signal and the status signal. Finally, the brake actuation signal is output at the friction brake and the torque request signal is output at the electric drive with at least one output and/or one interface of the trailer brake control device.

According to the disclosure, it is therefore possible to receive a positive or negative acceleration request from a towing vehicle, in particular from a brake control unit of the towing vehicle connected via the ISO 11992 interface. On the basis of this acceleration request, it is then possible, by utilizing the trailer brake control device, to control the electric drive and the friction brakes in an optimal manner with respect to energy, at least in the case of deceleration. The acceleration request signal preferably includes a positive acceleration request, such as a drive request or an additional drive request, namely for increasing the speed, or a negative acceleration request, such as a braking request or a deceleration request. In this case, depending on the status of the electric drive in the trailer, the electric drive can preferably be utilized, with priority, for a requested deceleration. A positive acceleration request is also referred to in the following as a requested positive acceleration and a negative acceleration request is also referred to as a requested negative acceleration.

The reception of an acceleration request signal for actuating friction brakes is already implemented in typical trailer brake control devices. According to the disclosure, however, additionally, a status signal of an electric drive is received and the brake actuation signal as well as a torque request in the form of a torque request signal are both generated and output on the basis of both received signals. In the case that the electronic braking system for a vehicle trailer comprises integrated pressure modulators in addition to the trailer brake control device, the brake actuation signal is transmitted to the pressure modulators, which, in accordance with the signal, apply a pressure to the friction brakes and, in this way, actuate the friction brakes. The pressure modulators can also be referred to as brake modulators. The distribution of the overall negative acceleration or positive acceleration requested in an acceleration request signal preferably takes place in such a way that the capability of the electric drive to accelerate, although, in particular, decelerate, is optimally integrated into the existing deceleration and stability control as well as the towing vehicle-trailer coordination of the brake control unit of the towing vehicle and of the trailer brake control device of the trailer, which communicate via the ISO 11992 interface.

Accordingly, a torque request signal for the electric drive is therefore generated by the trailer brake control device, and so the electric drive can appropriately contribute to the deceleration or to the increase of the speed. In particular, according to the disclosure, a deceleration can be supported by the electric drive. In addition, a brake actuation signal is then output, which does not correspond to the complete braking request contained, for example, in an acceleration request signal, but rather is adapted to the contribution of the electric drive in such a way that, in the case that an acceleration request cannot be completely met via the electric drive, the friction brakes of the trailer are utilized in such a way that, in sum, the requested deceleration, i.e., the requested negative acceleration, sets in.

Overall, in this way, a complete actuation of the electric drive by a trailer brake control device is possible, and so an electric drive of a vehicle trailer is completely controllable simply by expanding the functionality of the trailer brake control device, without additional components. Additionally, this actuation is highly efficient, since the trailer brake control device knows any given brake conditions or brake actions and, therefore, can precisely actuate the electric drive.

According to a first embodiment of the method, a status signal with a status variable is received, which indicates a presently available positive and/or presently available negative torque or a presently available positive and/or presently available negative torque change of at least one electric motor of the electric drive.

Accordingly, a piece of information is received by the trailer brake control device regarding which torque or which torque change is presently possible by the electric motor of the electric drive, in order to contribute to an acceleration requested via the acceleration request signal or to an acceleration request. Accordingly, the electric drive immediately delivers this piece of information for the trailer brake control device.

Alternatively or additionally, a status variable is received with the status signal from the electric drive, which receives a present torque of at least one, multiple, or all electric motor(s) and/or a present torque of at least one, multiple, or all electric motor(s) of the electric drive, a state of charge of at least one battery of the electric drive and/or a possible state of charge and/or discharge of at least one battery of the electric drive and/or at least one temperature of at least one component of the electric drive. In this case, a presently available positive and/or presently available negative torque and/or a presently available positive and/or presently available negative torque change of at least one electric motor of the electric drive is ascertained from the status variables with the controller of the trailer brake control device.

Therefore, according to this latter alternative, the available torque or an available torque change is not transmitted immediately from the electric drive to the brake control unit, but rather is ascertained, calculated, or determined by the brake control unit on the basis of present state values of the electric drive in the trailer brake control device.

Particularly preferably, a status signal, which includes a present torque and a presently available positive torque as well as a presently available negative torque of the motor or of each of the motors, is transmitted by the electric drive. In the controller of the trailer brake control device, a possible positive and/or negative torque change are/is determined by subtracting the present torque from the presently available positive or negative torque.

Accordingly, for example, status variables, which are provided anyway by an electric drive as a status signal for a motor control of the electric drive, can be received and utilized by the trailer brake control device, in order to be taken into account, in this way, in the generation of the torque request signal for the electric drive.

According to one preferred embodiment, the electric drive is connected, with a further bus, at a further interface of the trailer brake control device in order to transmit the status signal. The further bus is preferably a CAN bus, which is not connected to the brake control unit of the towing vehicle. Preferably, the further interface corresponds to a subsystem CAN interface, via which the trailer control device can also be connected, for example, to a telematics system for gathering operating data.

According to one further embodiment, a torque request signal is generated with the controller of the trailer brake control device, which corresponds to a positive or negative torque request, i.e., in particular, a torque value to be set or a positive or negative torque value change to be set, for the at least one electric motor of the electric drive. For this purpose, the torque request signal has a value, namely a positive or negative torque value or a positive or negative value of a torque change. The values are also at or below the presently available positive torque or the presently available positive torque change and/or at or above the presently available negative torque or the presently available negative torque change. If the trailer brake control device therefore knows the presently available torque or a presently available torque change, a torque request signal is generated in any case, which does not exceed or fall below the available values provided as a result and, in this way, does not result in actuation signals of the electric drive or of the electric motor that cannot be implemented by the electric drive or the electric motor. Therefore, on the one hand, an overload of the electric drive and, on the other hand, a non-implementable request of the electric drive are avoidable.

According to one further embodiment, the acceleration request signal includes a requested negative acceleration, namely a braking request, from the towing vehicle, in particular a brake control unit of the towing vehicle, to a vehicle trailer. The torque request signal and the brake actuation signal are then selected in such a way that the friction brakes actuated by these signals and the electric drive each contribute a portion to the requested acceleration, wherein the sum of the portions corresponds to the requested negative acceleration via the acceleration request signal.

Therefore, if a braking request is generated, for example, by a towing vehicle or a vehicle driver driving the towing vehicle, for example, by changing a brake pedal position, this braking request is initially converted, by a vehicle control unit or brake control unit of the towing vehicle, into an acceleration request signal, represented by a pneumatically or electrically transmitted control pressure or another suitable electrical signal within the ISO 11992 interface, for the vehicle trailer. A negative acceleration by the vehicle trailer is then requested via the acceleration request signal. This requested negative acceleration is then converted, depending on the physical variable of the acceleration request signal, in a suitable manner, by the trailer brake control device, on the one hand, into a torque request signal, namely a negative torque or a negative torque change, and, on the other hand, into a brake actuation signal for actuating at least one brake pressure of the friction brakes or at least one pressure modulator, which actuates the friction brakes. The signals are selected in such a way that the actuated friction brakes and the electric drive each contribute a portion to the requested negative acceleration, wherein the sum of the portions corresponds to the requested negative acceleration. The braking request is therefore implemented, on the one hand, by a negative torque of the electric drive, namely a generator mode of the electric motors or of the electric motor of the electric drive, in order to form the first portion, wherein the second portion is then provided by the friction brakes, namely by at least one brake pressure of the friction brakes. Brake pressure and negative torque together then form an implementation of the requested negative acceleration.

According to one further embodiment, the torque request signal is selected in such a way that the electric drive is actuated in such a way that the portion of the electric drive for implementing the requested negative acceleration is greater than the portion provided by the actuated friction brakes by means of the brake actuation signal. This applies, preferably, for the case in which the torque generated due to the torque request signal has a value that is at or above at value of the presently available negative torque and/or the presently available torque change. The electric drive is utilized, with priority, for the deceleration within the safety and stability limits of the entire vehicle.

This means, the aim is to implement a braking request by actuating the electric drive, and so a lowest possible braking force, via the friction brakes, is necessary for implementing a braking request. As a result, on the one hand, the friction brakes are conserved and, on the other hand, in the generator mode of the electric motor(s) of the electric drive, as much kinetic and potential energy as possible is converted into electrical energy, i.e., recuperated for subsequent utilization of the electric drive for the positive acceleration of the vehicle.

According to one further embodiment, an acceleration request signal that corresponds to a brake control pressure is received with the input of the trailer brake control device. The brake control pressure is preferably the physical brake control pressure at the brake control line between the towing vehicle and the trailer, via which the compressed air braking system of the towing vehicle is connected to the compressed air braking system of the trailer. A towing vehicle that therefore wants to prompt a vehicle trailer to decelerate generates an increased air pressure at the brake control line. Accordingly, a value of the pressure corresponds to a value of a requested negative acceleration. This means, the higher the pressure is, the higher is the requested negative acceleration. In the trailer brake control device, this change of the pressure in the brake control line is preferably detected via a sensor and converted into an electrical signal, or an electrical signal with a corresponding pressure value is derived therefrom. In addition to this electrical signal with the pressure value, the brake control signal and the torque request signal are generated on the basis of a load, i.e., the present vehicle mass, and on the basis of the status signal.

Accordingly, an acceleration request signal is also present for the case in which the towing vehicle, for example, does not comprise a brake control unit or vehicle control unit, which can carry out an actuation of the brakes of a vehicle trailer via an electrical control line. In the case of older towing vehicles, in particular, the electric drive in the vehicle trailer can be utilized for supporting the deceleration. Additional sensors in the vehicle trailer are not necessary in order to detect such negative decelerations in order to support them after detection. An efficient and favorable integration of an electric drive or the actuation of the electric drive is therefore possible.

According to one further embodiment, an interface of a bus, in particular an ISO 7638 interface, namely a CAN bus interface of a CAN bus, is utilized as at least one of the inputs and/or as at least one of the outputs of the trailer brake control device. One of the inputs is preferably an interface for an ISO 11992 CAN bus. The acceleration request signal is preferably received via this interface and preferably includes the "service brake demand value" signal from the ISO 11992 EBS11 message or the "retarder demand value" from the ISO 11992 EBS11 message. Via one further interface, the status signal is received and, additionally, at least the torque request signal is output. The further interface is also a bus interface, via which the trailer brake control device is connected to a bus interface of the electric drive by means of a bus.

Preferably, therefore, additionally or alternatively to receiving an acceleration request signal as brake control pressure, an acceleration request signal is transmitted from the brake control unit of the towing vehicle in the form of an electrically transmitted brake pressure and received by the trailer brake control device. The brake pressure electrically transmitted in this way, in particular in the form of a value, is transmitted in such a way that it preferably precisely corresponds to the value that is also transmitted as physical brake pressure via the brake control line. As a result, it is possible, preferably, to compare the two values. In the case of an interruption of the bus connection, the physical brake control pressure is available as a fall-back position. Preferably, however, the value is utilized by the bus as a requested negative acceleration, since this is available sooner. The trailer brake control device is therefore preferably directly connected via an interface to a the bus, from which signals, namely, in particular, a requested negative acceleration, such as a deceleration or braking request, are routed to the trailer brake control device. This bus is connected to the brake control unit of the towing vehicle. Additionally, the trailer control device is connected to the electric drive via a further bus, preferably a CAN bus, so that status signals from the electric drive, which, for example, are also intended for the towing vehicle for the status determination, can be retrieved directly by the trailer brake control device and utilized for generating the brake actuation signals and the torque request signal. The torque request signal itself can also be transmitted to the electric drive via the further interface and, thereby, via the bus.

When the term "signal", namely, in particular, acceleration request signal, status signal, and torque request signal, is utilized here, the term is therefore not limited, in the case of the transmission of the signals via a bus, exclusively to an electrical signal that immediately transmits appropriate information. Rather, the term "signal", when the signal is transmitted via a bus, is understood to be a bus message or a data packet with the information of the corresponding signal. Accordingly, in particular, the acceleration request signal, the status signal, and the torque request signal are each preferably transmitted in the form of messages, in particular CAN bus messages, via the particular bus. CAN bus messages correspond to messages (messages/PGN), wherein each message includes one or multiple signals (signal/SPN) that represent(s) the information.

According to one further embodiment, the acceleration request signal corresponds to a brake pressure, which is transmitted by the brake control unit of the towing vehicle. Accordingly, the setpoint brake pressure is available for generating the brake actuation signal and the torque request signal. The setpoint brake pressure corresponds, in this case, to a value, received via the interface, in a bus message, which is then converted, for example, into the torque request signal for the electric drive and into brake pressures of the individual friction brakes in the trailer brake control device based on a stored, load-dependent brake force distribution.

According to one further embodiment, a continuous braking request is additionally received with the input, which is designed as an interface, in particular as an interface for connecting to a brake control unit via an ISO 11992 bus. The continuous braking request is a piece of information that is generated in the brake control unit of the towing vehicle in order to utilize the retarders of the towing vehicle. Preferably, the continuous braking request corresponds to a requested negative acceleration and is received with the acceleration request signal, in particular as a signal of the EBS 11 message "retarder demand value". This generates a torque request signal on the basis of the continuous braking request.

The brake control unit of the towing vehicle can therefore advantageously make use of the continuous braking effect of the electric drive in the trailer via this signal, with priority, within the scope of the vehicle stability and safety systems. For this purpose, the trailer provides a piece of information via the ISO 11992 interface regarding the available continuous braking torque of the electric drive in the trailer to the brake control unit of the towing vehicle. This means an actuation of the electric drive can also be utilized for supporting the retarders in the case of a requested activation of the retarders of a vehicle trailer. For this purpose, the electric drive is therefore generated with the torque request signal, which is dependent on the continuous braking request. Within the scope of the continuous braking request, it is therefore also possible to decelerate the entire vehicle (not only the trailer) using the electric drive of the trailer.

According to one further embodiment, the acceleration request signal is a requested positive acceleration, namely a drive request or a speed increase request. The acceleration request signal is dependent on and, therefore, representative for an accelerator pedal position or a signal derived from the accelerator pedal position. On the basis of the acceleration request signal and the status signal, a torque request signal is then generated, which corresponds to a positive torque value or a positive torque value change, in order to implement the requested positive acceleration. An accelerator pedal position or a signal derived therefrom is already transmitted nowadays via the bus of the towing vehicle. In order to transmit the accelerator pedal position to the trailer brake control device, a positive value range of the continuous braking requests is preferably utilized within the ISO 11992 interface EBS11 "retarder demand value". The brake control unit of the towing vehicle therefore receives the accelerator pedal position via a bus of the towing vehicle and forwards this directly proportionally as a positive value in the EBS11 message, in particular in the "byte retarder demand value", to the trailer brake control device.

According to one further embodiment, the torque request signal to the electric drive is additionally generated, with the trailer brake control device, on the basis of a detected slip of at least one of the wheels of a vehicle trailer. In particular for assisting safety systems that carry out actions on the basis of a slip of the trailer vehicle wheels, the torque request signal is also generated, in order to assist these systems. An improvement of the safety of a vehicle trailer or of the functionality of the safety systems, in particular also a more efficient implementation of suitable measures for safety support, are possible by integrating the electric drive.

In addition, the present disclosure provides a computer program product, which includes commands, that, carried out on a trailer brake control device, carry out the steps of one of the embodiments of the aforementioned method.

In addition, the present disclosure provides a trailer brake control device for a vehicle trailer with at least one electric drive. The trailer brake control device includes at least one input and/or one interface for receiving an acceleration request signal from a towing vehicle and at least one input and/or interface for receiving a status signal with at least one status variable of the electric drive of the vehicle trailer from the electric drive. In addition, the trailer brake control device includes at least one controller for generating at least one brake actuation signal for a friction brake of the vehicle trailer and a torque request signal for the electric drive. Here, the controller is configured for generating the brake actuation signal and the torque request signal depending, in each case, on the acceleration request signal and the status signal. In addition, the trailer brake control device includes at least one output and/or one interface for outputting the brake actuation signal and the torque request signal.

According to one embodiment, the trailer brake control device is configured for carrying out a method according to one of the aforementioned embodiments.

In addition, the present disclosure provides a trailer vehicle with a trailer brake control device according to one of the aforementioned embodiments and an electric drive, which is actuatable by the trailer brake control device.

Figure 1:
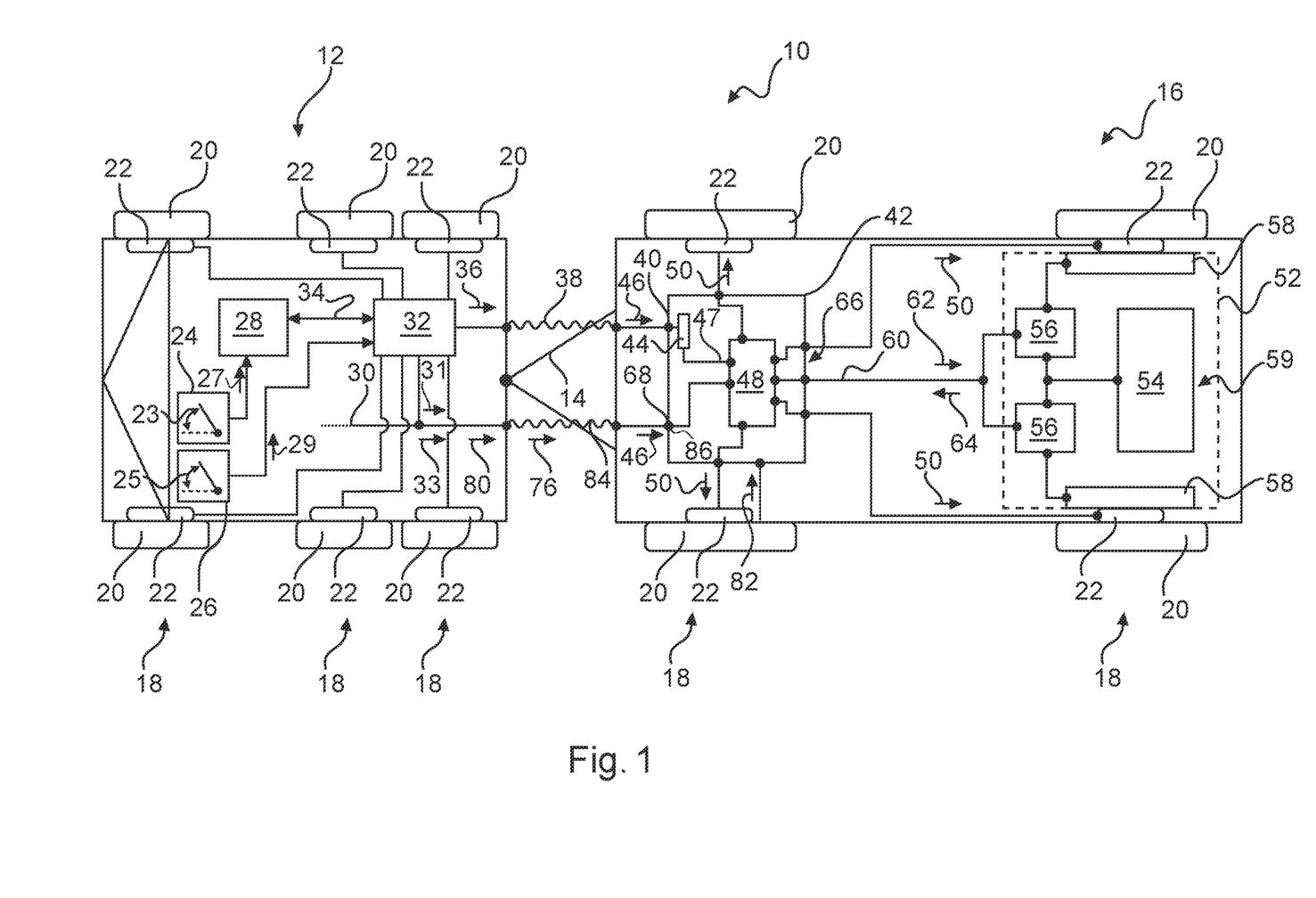
FIG. 1 illustrates a towing vehicle with a vehicle trailer.

FIG. 1 shows a vehicle combination 10, including a towing vehicle 12, which is, for example, a commercial vehicle, and is connected via a drawbar 14 to a vehicle trailer 16. The vehicle trailer 16 is therefore towable by the towing vehicle 12. The towing vehicle 12 and the vehicle trailer 16 each include multiple axles 18, which each include two wheels 20. Each of the wheels 20 is equipped with a friction brake 22, in order to decelerate the wheels 20 in the case of a braking request, namely a requested negative acceleration. At least one of the axles 18 of the towing vehicle 12 is driven by an internal combustion engine or an electric drive, wherein neither the internal combustion engine nor the electric drive is represented in FIG. 1, for the sake of clarity.

In order to drive the vehicle 12, a request for a speed increase 27 or a braking request 29 is signaled via a variation of an accelerator pedal position 23 of an accelerator pedal 24 and via a variation of a brake pedal position 25 of a brake pedal 26 by an operator of the towing vehicle 12. The accelerator pedal 24 is connected to a vehicle control unit 28 for this purpose. The brake pedal 26 is connected to a brake control unit 32 for this purpose. The vehicle control unit 28 transmits control signals for actuating the drive (not represented) on a bus (not represented) connected to the vehicle control unit 28. The vehicle control unit 28 ascertains, from the request for a speed increase 27, a requested positive acceleration 31 and transmits this via a connection 34 to the brake control unit 32. The brake control unit 32 outputs the requested positive acceleration 31 or the requested negative acceleration 33 in an acceleration request signal 46 at the bus 30. A requested negative acceleration 33 for the vehicle trailer 16 is ascertained from the braking request 29 and is output at the bus 30.

In addition, the friction brakes 22 are connected to the brake control unit 32, and so, in the case of a braking request triggered via the brake pedal 26, the braking request is convertible into brake signals for the friction brakes 22.

In addition, the brake control unit 32 of the towing vehicle 12 generates, in the case of a braking request 29, a brake control pressure 36 that is also transmitted via a brake control line 38 as an acceleration request signal 46 to the vehicle trailer 16. The brake control line 38 is connected to a first input 40 of a trailer brake control device 42. A sensor 44 of the trailer brake control device 42 converts the brake control pressure 36, which is transmitted via the brake control line 38, into an electrical signal 47 and transmits this to a controller 48 of the trailer brake control device 42. On the basis of this signal 47, friction brakes 22 of the two axles 18 (represented here) of the vehicle trailer 16 are actuatable. Therefore, on the basis of the brake control pressure 36, which is routed as an acceleration request signal 46 to the trailer brake control device 42 via the brake control line 38, signals, namely brake actuation signals 50, are output, in order to actuate the friction brakes 22.

Additionally, the vehicle trailer 16 comprises an electric drive 52, which includes a battery 54, which is rechargeable and can also be referred to as an accumulator. In addition to the battery 54, the electric drive includes two power converters 56, which, with the energy of the battery 54, supply electric motors 58 with energy in order to generate a positive torque. The battery 54, the power converters 56, and the electric motors 58 correspond to components 59 of the electric drive 52. According to an alternative exemplary embodiment (not represented here), one power converter 56 per electric motor 58 is provided. In the case that only one electric motor 58 is provided, the electric drive 52 therefore also includes only one power converter 56.

The electric motors 58 can also be operated in the generator mode or generative mode, so that electrical energy is fed back into the battery 54 via the power converters 56. In order to actuate the power converters 56, the electric drive 52 is connected to the trailer brake control device 42 via a further bus 60.

An actuation of the power converters 56 specifies, on the one hand, whether the electric motors 58 are to be operated in the generator mode or in the motor mode, and which torque is to be applied in so doing. In the case of the operation of the electric motors 58 in the motor mode, a positive torque is referred to, while the torque, i.e., a value of the torque, in the generator mode of the electric motors 58 is referred to as negative torque. In order to actuate the electric drive 52, namely, in particular, the power converter 56, a torque request signal 62 is transmitted to the electric drive 52, for this purpose, from the trailer brake control device 42 via the control line 60. In addition, the electric drive 52 transmits a status signal 64 to the trailer brake control device 42, in order to be able to notify the trailer brake control device 42, for example or among other things, which presently available positive or presently available negative torque or which presently available positive or presently available negative torque change can be provided by the electric drive 52 at the present point in time. The presently available torques or torque changes are dependent on the present operating state of the electric drive.

The trailer brake control device 42 is also configured for generating, on the basis of the status signal 64 and the acceleration request signal 46, a torque request signal 62, on the one hand, and brake actuation signals 50, on the other hand, and outputting these via its outputs 66. For a simplified representation, the brake actuation signals 50 are routed directly to the friction brakes 22 in this case. Actually, these brake actuation signals 50 usually lead to brake modulators, which open and close valves on the basis of the brake actuation signals 50, in order to provide a pressure for the friction brakes 22 that is dependent on the brake actuation signal 50.

The trailer brake control device 42 is also connected to the bus 30 via a further input 68. Additionally or alternatively to the acceleration request signal 46, which is on the basis of the brake control pressure 36, which is received via the brake control line 38, the trailer brake control device 42 can therefore also receive an acceleration request signal 46 in an electronic manner. Preferably, the bus 30 corresponds to a CAN bus 84 and the input 68 corresponds to an interface 86 for the CAN bus 84. Accordingly, additionally or alternatively, in particular redundantly, an acceleration request signal 46 is receivable, which is utilized, together with the status signal 64, in order to generate a torque request signal 62, on the one hand, and brake actuation signals 50, on the other hand, with the trailer brake control device 42.

The controller 48 of the trailer brake control device 42 is also configured for additionally generating and transmitting a torque request signal 62 in the case of a continuous braking request 76 in an acceleration request signal 46 received via the further input 68. In addition, a drive request signal 80 is also receivable from the bus 30 via the further input 68, and is also transmitted in an acceleration request signal 46 and from which a torque request signal 62 is generated in the trailer brake control device 42, in order to operate the electric motors 58 with a positive torque, which is dependent on the drive request signal 80. The drive request signal 80 is, for example, a signal generated or derived from a requested positive acceleration 31. In order to actuate the electric drive 52 and the friction brakes 22, the control unit receives at least one wheel rotational speed, from which the slip of the wheel is ascertainable.

Figure 2:
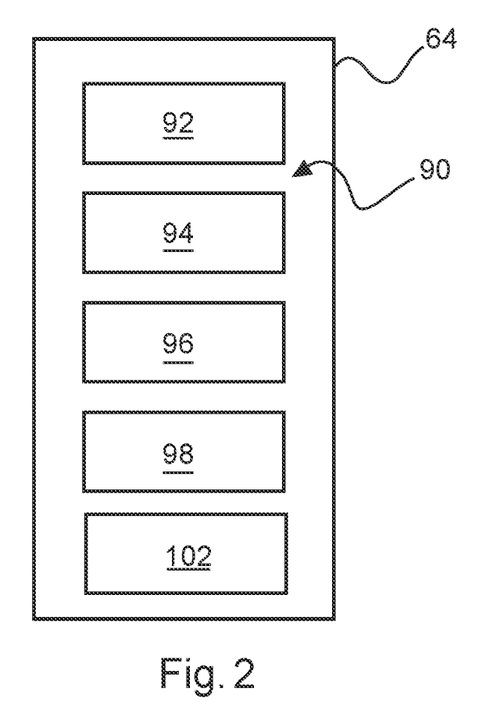
FIG. 2 illustrates a status signal.

FIG. 2 shows an exemplary representation of a status signal 64, of the type that is transmitted from the electric drive 52 to the trailer brake control device 42. Here, the status signal 64 includes five status variables 90. According to other exemplary embodiments, which are not represented here, the status signal 64 includes one, two, three, four, or more than five of the status variables 90 represented here. The status variables 90 include, here, an available positive torque 92, an available negative torque 94, an available positive torque change 96, an available negative torque change 98, and a present rotational speed 102.

Figure 3:
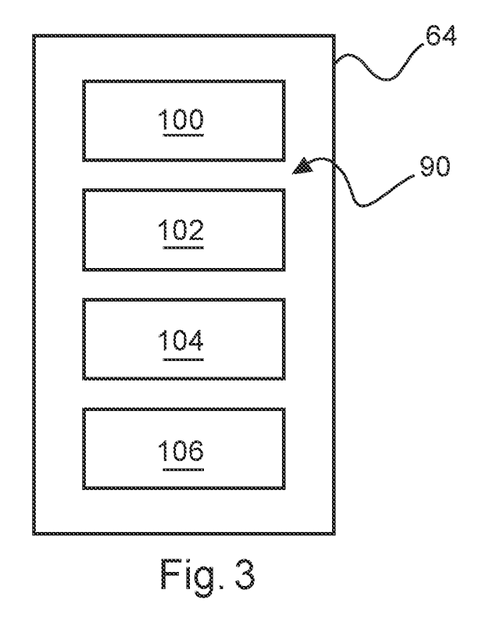
FIG. 3 illustrates a further status signal.

FIG. 3 shows one further exemplary representation of a status signal 64, which also contains status variables 90. The status signal 64 in this case includes status variables 90 that correspond to a present torque 100 of a present rotational speed 102 of at least one electric motor 58 of the electric drive 52, a state of charge 104 of the battery 54 of the electric drive 52, and a temperature 106 of at least one component 59 of the electric drive 52. Four status variables 90 are also represented in FIG. 3, wherein, alternatively, the status signal 64 can also include only one, two, three, or more than four status variables 90 according to other exemplary embodiments.

Figure 4:
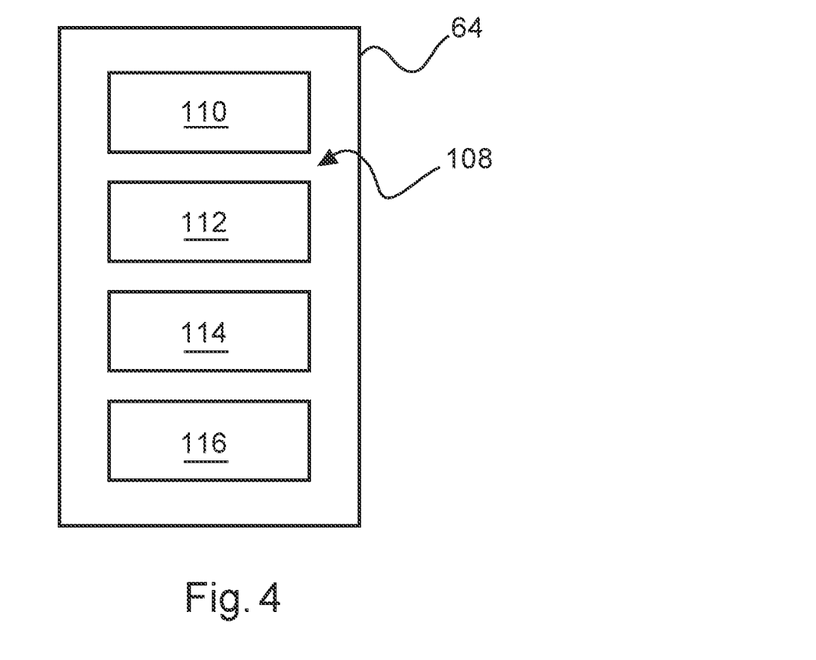
FIG. 4 illustrates a torque request signal.

FIG. 4 shows, by way of example, a torque request signal 62 of the type that is sent or transmitted from the trailer brake control device 42 to the electric drive 42. By way of example, four values 108 are represented, wherein a torque request signal 62 usually includes only one of the values 108 according to one preferred exemplary embodiment. By way of example, the torque request signal 62 includes, here, the values 108 positive torque 110, negative torque 112, positive torque change 114, and negative torque change 116.

Figure 5:
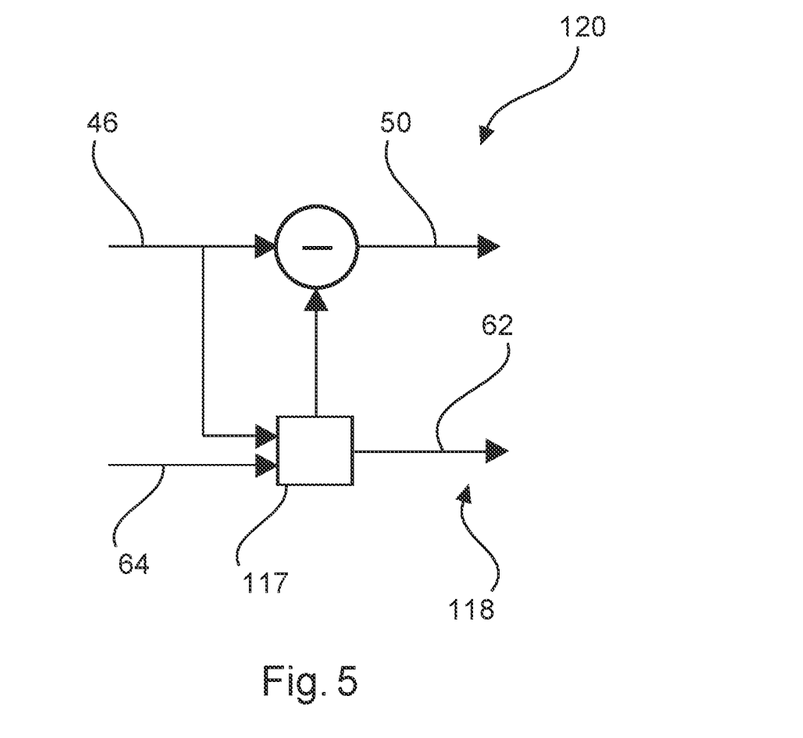
FIG. 5 illustrates an example of an implementation.

FIG. 5 shows an exemplary implementation of the method in the controller 48 of the brake control unit 42. Initially, an acceleration request signal 46 with a requested negative acceleration 33 and an available negative torque 94 is received. In a function block 117, the available torque 94 is limited by the acceleration request signal 46. Subsequently, the limited torque is subtracted from the acceleration request signal 46 and the result is output as a brake actuation signal 50. Simultaneously, the limited torque change is output as a torque request signal 62. The torque request signal 62 corresponds to a first portion 118 and the brake actuation signal 50 corresponds to a second portion 120 of the acceleration request signal 46. This exemplary embodiment corresponds to a simplified representation. Actually, a brake pressure, which is also referred to as setpoint brake pressure, is electronically or pneumatically received in the form of the acceleration request signal 46. A load-dependent brake force distribution is calculated from this brake pressure on the basis of the load situation of the vehicle trailer 16, which is additionally taken into account. For this purpose, which brake force must be generated by which brake cylinder pressure on the basis of the load and the setpoint brake pressure is preferably stored in the controller 48. This is also referred to as brake calculation. In addition, the available torque 94 is received or calculated and this torque is converted into a force. The force providable via the available torque is now subtracted from the brake force set via the brake cylinder pressures. This takes place, at most, at the level of the brake force required by the brake pressure. The result is then, in turn, converted into reduced brake cylinder pressures and output as brake actuation signals 50. Additionally, the electric drive 52 is correspondingly actuated with a torque request signal 62.

In the case that a requested positive or negative acceleration via the acceleration request signal 46 can be provided solely by the electric drive 52, the second portion 120 corresponds, for example, to a value of 0, and so the friction brakes 22 are actuated not at all or with a zero value, wherein the first portion 118 therefore also corresponds to a value that is at or above the presently available negative torque change 98, although does not necessarily precisely correspond to the available negative torque change 98.

Figure 6:
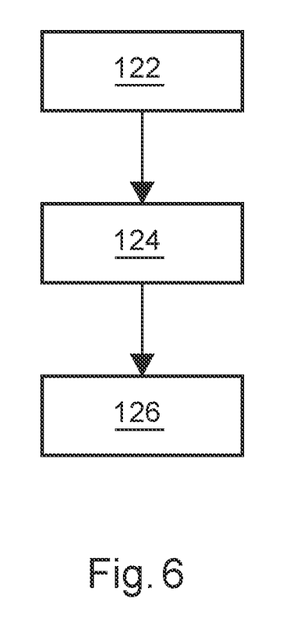
FIG. 6 illustrates steps of the method.

FIG. 6 shows the steps of the method according to one exemplary embodiment. Initially, an acceleration request signal 46 and a status signal 64 are received 122 by a trailer brake control device 42. Subsequently, a brake actuation signal 50 for a friction brake 22 of the vehicle trailer 16 and a torque request signal 62 for the electric drive 52 of the vehicle trailer 16 are generated 124. Subsequently, the brake actuation signal 50 and the torque request signal 62 are output 126.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 10 vehicle combination
12 towing vehicle
14 drawbar
16 vehicle trailer
18 axles
20 wheels
22 friction brake
23 accelerator pedal position
24 accelerator pedal
25 brake pedal position
26 brake pedal
27 request for a speed increase
28 vehicle control unit
29 braking request
30 bus
31 requested positive acceleration
32 brake control unit
33 requested negative acceleration
34 direct connection
36 brake control pressure
38 brake control line
40 first input
42 trailer brake control device
44 sensor
46 acceleration request signal
47 electrical signal
48 controller
50 brake actuation signal
52 electric drive
54 battery
56 power converter
58 electric motors
59 component
60 bus
62 torque request signal
64 status signal
66 outputs
68 further input
70 brake pressure
76 continuous braking request
80 drive request signal
82 wheel rotational speed
84 CAN bus
86 interface
90 status variable
92 available positive torque
94 available negative torque
96 available positive torque change
98 available negative torque change
100 present torque
102 present rotational speed
104 state of charge
106 temperature
108 values
110 positive torque
112 negative torque
114 positive torque change
116 negative torque change
117 function block
118 first portion
120 second portion
122-126 steps of the method What claimed is:

1. A method for a trailer brake control device of a vehicle trailer with an electric drive, the method including:
receiving, from a towing vehicle via at least one input and/or at least one interface of the trailer brake control device, at least one acceleration request signal with a requested positive acceleration or a requested negative acceleration;
receiving, from the electric drive of the vehicle trailer via the at least one input and/or the at least one interface of the trailer brake control device, a status signal with at least one status variable of the electric drive of the vehicle trailer;
generating, with a controller of the trailer brake control device, at least one brake actuation signal for at least one friction brake of the vehicle trailer and a torque request signal for the electric drive, each based on the at least one acceleration request signal and the status signal; and
outputting the brake actuation signal and the torque request signal via at least one output and/or at least one interface of the trailer brake control device.

2. The method as claimed in claim 1, wherein the status signal includes at least one status variable, wherein the status variable:
indicates a present torque and/or a presently available positive torque and/or a presently available negative torque and/or a presently available positive torque change and/or a presently available negative torque change of at least one, multiple, or all electric motor(s) of the electric drive and/or
indicates a present torque of at least one, multiple, or all electric motor(s) of the electric drive and/or a present rotational speed of at least one, multiple, or all electric motor(s) of the electric drive and/or a present battery state of charge of at least one battery of the electric drive and/or a possible battery state of charge and/or discharge of at least one battery of the electric drive and/or of at least one present temperature of at least one component of the electric drive and, from the status variables, a presently available positive torque and/or a presently available negative torque and/or a presently available positive torque change and/or a presently available negative torque change of at least one electric motor of the electric drive are/is ascertained from the status variables with the controller.

3. The method as claimed in claim 2, wherein the controller of the trailer brake control device generates a torque request signal that corresponds to a value of a positive torque, of a negative torque, of a positive torque change, or of a negative torque change, which is at or below the available positive torque or the available positive torque change and/or at or above the available negative torque or the available negative torque change.

4. The method as claimed in claim 1, wherein the torque request signal includes a requested negative acceleration at a vehicle trailer of a towing vehicle, and wherein the torque request signal and the brake actuation signal are selected in such a way that the friction brakes of the vehicle trailer and the electric drive of the vehicle trailer, which have been appropriately actuated as a result, each contribute a portion to the requested negative acceleration, and the sum of their portions corresponds to the requested negative acceleration.

5. The method as claimed in claim 4, wherein the torque request signal is selected in such a way that the portion of the electric drive with respect to the requested negative acceleration is greater than the portion of the friction brakes, preferably provided a value of the torque request signal is equal to or greater than the presently available negative torque and/or the presently available negative torque change.

6. The method as claimed in claim 1, wherein at least one acceleration request signal corresponds to a brake control pressure of a brake control line connected to the trailer brake control device via the input.

7. The method as claimed in claim 1, wherein the or at least one of the input(s) and/or the output are/is each designed as an interface of a bus, and, via the interface, the acceleration request signal is received.

8. The method as claimed in claim 1, wherein the acceleration request signal is received from a brake control device of a towing vehicle via a bus and includes a requested negative acceleration.

9. The method as claimed in claim 1, wherein a continuous braking request is received via the interface of the trailer brake control device and the torque request signal is generated based on the continuous braking request and the status signal.

10. The method as claimed in claim 1, wherein the acceleration request signal includes a requested positive acceleration dependent on an accelerator pedal position, and the torque request signal is generated based on the requested positive acceleration, while a brake actuation signal is generated, which leaves the friction brakes unactuated, wherein the torque request signal is received as a retarder demand value.

11. The method as claimed in claim 1, wherein the torque request signal and the brake actuation signal are generated additionally based on a detected slip of at least one of the wheels of the vehicle trailer.

12. A computer program product comprising processor-executable instructions stored on a non-transitory computer readable medium that, when executed by a processor, cause the process to perform the method as claimed in claim 1.

13. A trailer brake control device for a vehicle trailer with an electric drive, the trailer brake control device comprising:
    an input and/or an interface configured to receive, from a towing vehicle, at least one acceleration request signal with a requested positive acceleration or a requested negative acceleration and, from the electric drive of the vehicle trailer, a status signal with at least one status variable of the electric drive of the vehicle trailer,
    a controller configured to generate at least one brake actuation signal for a friction brake of the vehicle trailer and a torque request signal for the electric drive, each based on the at least one acceleration request signal and the status signal and
    an output and/or an interface configured to output the brake actuation signal and the acceleration request signal.

14. A vehicle trailer with a trailer brake control device as claimed in claim 13 and an electric drive, wherein the trailer brake control device is configured for controlling the electric drive.

15. The trailer brake control device as claimed in claim 13, wherein the trailer brake control device is configured to control an electric drive of a vehicle trailer via torque request signals for the electric drive, the torque request signals being generated by the trailer brake control device.

* * * * *